3,080,367
PROCESS FOR THE PRODUCTION OF CYANURIC CHLORIDE FROM TETRAMERIC CYANOGEN CHLORIDE
Adolf von Friedrich and Paul Schmitz, Leverkusen, Germany, assignors to Farbenfabriken Bayer Aktiengesellschaft, Leverkusen, Germany, a corporation of Germany
No Drawing. Filed Oct. 11, 1960, Ser. No. 61,847
Claims priority, application Germany Oct. 28, 1959
4 Claims. (Cl. 260—248)

The present invention relates to a process for the production of cyanuric chloride from tetrameric cyanogen chloride with the use of special catalysts.

When cyanogen chloride is polymerised, with or without solvents, other polymers of higher molecular weight are formed as well as the desired cyanuric chloride. When manufacturing cyanuric chloride, the said polymers must be separated out very carefully, because they generally have a very disturbing effect and the subsequent reactions. Where the polymers of higher molecular weight are solid and infusible, the separation thereof does not present any particular difficulty. Nevertheless, there is frequently formed during the polymerisation of cyanogen chloride a tetrameric cyanogen chloride which is a liquid at room temperature and which has a boiling point only slightly different from that of cyanuric dichloride. The separation of this compound, which frequently occurs in comparatively large quantities, is difficult, involves high expense and constitutes a severe loss of material, because there has not so far been any use for the tetrameric compound.

The liquid fraction of the polymer also forms when using a polymerisation catalyst and the quantity thereof is largely independent of the nature of the catalyst.

One object of the present invention is to provide a process for the production of cyanuric chloride. Another object of the invention consists in using as the starting material for this process, tetrameric cyanogen chlorides which occur as substantially unexploitable secondary products in the known process for the production of cyanuric chloride. Yet another object is to provide a process for the production of cyanuric chloride which can be carried out easily and which leads to high yields. Other objects of the invention will be apparent from the following description and from the examples.

It has been found that cyanuric chloride can be very easily produced industrially and economically from tetrameric cyanogen chloride if the latter is heated to a temperature of above 300° C., advantageously at temperature from 350 and 420° C., in the presence of boron, aluminum, silicon, tin, arsenic, antimony, bismuth, iron, cobalt, nickel, copper, zinc, cadmium, titanium, chromium, molybdenum, tungsten or manganese, their oxides, sulphides or halides, as catalysts. In this process, only small quantities of higher polymers of cyanogen chloride are formed in addition to cyanuric chloride.

It could not in any way be anticipated that the catalysts according to the invention would effect a conversion of tetrameric cyanogen chloride into cyanuric chloride when using temperatures higher than 300° C. Catalysts which are similar chemically are completely ineffective.

Both pure tetrameric cyanogen chloride and mixtures of tetrameric cyanogen chloride with other higher polymers of cyanogen chloride, such as those formed as secondary products when producing cyanuric chloride from cyanogen chloride can be used as starting materials for this process.

The following metals are to be considered especially useful: boron, silicon, arsenic, antimony, bismuth, titanium, chromium, molybdenum, tungsten, manganese, and more especially aluminum, iron and zinc. The oxides, sulphides and halides of these metals are equally effective.

Particularly good results are produced with the oxides, sulphides and halides of boron, aluminum, bismuth, iron, zinc, tatanium, chromium, molybdenum, and tungsten.

The following are mentioned as examples of particularly suitable catalysts: boron fluoride, fluoboric acid, aluminum chloride, aluminum oxide, antimony pentachloride, iron chloride, iron oxide, iron sulphide, zinc chloride, zinc oxide, zinc sulphide, titanium tetrachloride, chromium oxide, and molybdenum oxide.

The catalysts referred to can be used separately or in admixture.

The effective quantities of catalysts differ considerably and extend from pronounced catalytic quantities such as about 0.0001% to about 10%, related to the tetrameric cyanogen chloride being used. Generally speaking, the catalysts are used in quantities from 0.5 to 5%. Since traces of catalyst show very good effects, it is also possible to dispense entirely with the addition of a catalyst if one of the said metals is contained in the wall of the reaction vessel.

The catalysts can be directly used as such or can be introduced into the reaction vessel on inert supports. They are either added prior to the commencement of the reaction or continuously during the reaction.

For carrying out the process of the invention, a mixture of the catalyst and of the tetrameric cyanogen chloride, if necessary with other polymers of cyanogen chloride, is heated in a pressure vessel to temperatures above 300° C. The reaction times depend on the efficacy of the catalysts and also on the quantity thereof which is added. A few minutes is sufficient in most favourable cases, but frequently several hours are required.

After completing the reaction, the reaction product is worked up by fractional distillation or sublimation. There is directly obtained a pure cyanuric chloride which can be used directly for the further reactions.

The process can also be carried out continuously by the catalyst being placed in a pressure vessel and by the tetrameric cyanogen chloride being progressively introduced and removed again in suitable manner, the catalyst remaining in the reaction vessel.

For carrying out the reaction according to the invention, the tetrameric cyanogen chloride in the following examples is introduced into a pressure vessel together with the relevant catalyst and heated to the temperature indicated in each case. The cooled reaction mixture is subjected to fractional distillation and in this way the yield of cyanuric chloride is established. In some of the examples, no catalyst is actually added and in these cases there are always employed reaction vessels of which the walls contain one or more of the catalytically active metals.

The present invention is further disclosed in the following examples, which are illustrative but not limitative thereof.

*Example 1*

20 parts of tetrameric cyanogen chloride and 1 part by weight of tungstic acid are heated for 1 hour to 350° C. in a closed reaction vessel. A solid yellow mass containing 73.6% of cyanuric chloride is formed.

*Example 2*

Under the same conditions as described in Example 1, but using 0.9 part by weight of powdered zinc, cyanuric chloride is obtained in a quantity corresponding to 79.3% of the quantity of tetrameric cyanogen chloride introduced.

*Example 3*

If 30 parts by weight of tetrameric cyanogen chloride and 1.2 parts by weight of aluminium oxide are heated in a closed glass container to a temperature of 380°

C. for 7 hours, a solid mass is obtained which contains 26.1% by weight of cyanuric chloride.

*Example 4*

If the aluminium oxide used in the experiment described in Example 3 is replaced by the same quantity of molybdenum-VI-oxide, cyanuric chloride is obtained in a quantity of 86% of the tetrameric cyanogen chloride introduced.

*Example 5*

If 50.6 parts by weight of tetrameric cyanogen chloride are heated with 2 parts by weight of titanium tetrachloride to a temperature of 400° C. for 35 minutes, 44.7 parts by weight of cyanuric chloride are obtained, the remainder being higher polymers of cyanogen chloride.

*Example 6*

With 0.5 part by weight of anhydrous iron-III-chloride, 23.2 parts by weight of cyanuric chloride with a melting point of 147° C. are obtained from 27.5 parts by weight of tetrameric cyanogen chloride after heating for 1.6 hours at 370° C.

*Example 7*

The same results as in Example 6 are obtained by using 0.3 part by weight of aluminium chloride instead of iron chloride.

*Example 8*

A particularly effective catalyst for the conversion of tetrameric cyanogen chloride into cyanuric chloride is a mixture of equal parts of aluminium oxide and chromium oxide, which have been obtained by joint precipitation from the nitrates by means of sodium hydroxide solution. Using three parts by weight of this anhydrous catalyst and by heating 300 parts by weight of tetrameric cyanogen chloride for 2 hours to a temperature of 405° C., 268.3 parts by weight of cyanuric chloride are obtained.

*Example 9*

Under the influence of 1.4 parts by weight of iron sulphide, there are obtained from 122 parts by weight of tetrameric cyanogen chloride, after heating to 345° C. for 180 minutes in a closed vessel, 93 parts by weight of cyanuric chloride.

*Example 10*

From 81 parts by weight of tetrameric cyanogen chloride and with the addition of 0.5 part by weight of zinc sulphide, 66.7 parts by weight of cyanuric chloride are obtained when the reaction mixture has previously been heated for 1 hour to 380° C.

*Example 11*

If 20 parts by weight of tetrameric cyanogen chloride are heated with 1 part by weight of metallic iron in a closed glass vessel for 4 hours to 335° C., 14.6 parts by weight of cyanuric chloride are obtained.

*Example 12*

Using an autoclave made of chromium-containing stainless steel with a capacity of 800 parts by volume, 200 parts by weight of tetrameric cyanogen chloride are heated for 6 hours to a temperature of 350° C. In the working up of the solidified substance 79.6% of cyanuric chloride are obtained as well as 16.9% of solid more highly polymeric cyanogen chlorides.

*Example 13*

If the experiment described in Example 12 is carried out at a temperature of 380° C. for a period of 1 hour, 74.5% of cyanuric chloride and 24.5% of higher polymers are obtained.

*Example 14*

If the tetrameric cyanogen chloride is heated in an iron pressure vessel for 3 hours at 400° C., there are obtained 82.6% of pure cyanuric chloride as well as 17.4% of solid higher polymers, which are for the major part neither fusible nor distillable.

*Example 15*

If the experiment of Example 14 is repeated, but using a temperature of 420° C. and a reaction period of 3 hours, 80.9% of the tetrameric cyanogen chloride is converted into cyanuric chloride.

*Example 16*

Maintaining a reaction temperature of 450° C., a 59.7% conversion of the tetrameric cyanogen chloride to cyanuric chloride is obtained after a reaction period of 30 minutes.

We claim:
1. A process for the production of cyanuric chloride from tetrameric cyanogen chloride, which comprises heating tetrameric cyanogen chloride to a temperature between 300° C. and 420° C. in the presence of a catalyst selected from the group consisting of boron, aluminum, silicon, tin, arsenic, antimony, bismuth, iron, cobalt, nickel, copper, zinc, cadmium, titanium, chromium, molybdenum, tungsten and manganese, their oxides, sulphides and halides, and recovering the cyanuric chloride thus formed by fractional distillation.
2. Process according to claim 1 wherein the cyanuric chloride is recovered by fractional sublimation.
3. Process according to claim 1 wherein the tetrameric cyanogen chloride is applied in admixture with higher polymers of cyanogen chloride.
4. Process according to claim 1 wherein said catalyst is a mixture of about equal parts of the oxides of chromium and aluminum.

References Cited in the file of this patent
UNITED STATES PATENTS

| | | |
|---|---|---|
| 2,499,441 | Woodward | Mar. 1, 1950 |
| 2,692,880 | Confrancesco | Oct. 26, 1954 |
| 2,872,446 | Von Friedrich et al. | Feb. 3, 1959 |

FOREIGN PATENTS

| | | |
|---|---|---|
| 1,098,518 | Germany | Feb. 2, 1961 |